United States Patent
Gulati et al.

(10) Patent No.: US 12,048,006 B2
(45) Date of Patent: Jul. 23, 2024

(54) FRAME BASED LISTEN BEFORE TALK FOR RADAR

(71) Applicant: QUALCOMM Incorporated, San Diego, CA (US)

(72) Inventors: Kapil Gulati, Belle Mead, NJ (US); Dan Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/305,793

(22) Filed: Jul. 14, 2021

(65) Prior Publication Data

US 2022/0022254 A1  Jan. 20, 2022

Related U.S. Application Data

(60) Provisional application No. 62/705,792, filed on Jul. 15, 2020.

(51) Int. Cl.
*H04W 74/0816* (2024.01)
*H04W 72/0446* (2023.01)

(52) U.S. Cl.
CPC ... *H04W 74/0816* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2007/0018886 A1* | 1/2007 | Watanabe | G01S 7/0232 342/91 |
| 2007/0194979 A1* | 8/2007 | Hiraoka | G01S 19/17 342/357.55 |
| 2008/0013564 A1* | 1/2008 | Koski | H04W 74/0833 370/445 |
| 2016/0338104 A1* | 11/2016 | Yin | H04W 74/0816 |
| 2018/0031674 A1* | 2/2018 | Bordes | G01S 7/0234 |

(Continued)

FOREIGN PATENT DOCUMENTS

EP          1983353 A1     10/2008

OTHER PUBLICATIONS

Ishikawa et al., "Packet-based FMCW Radar using CSMA Technique to Avoid Narrowband Interference", 2019 International Radar Conference. (Year: 2019).*

(Continued)

*Primary Examiner* — Faruk Hamza
*Assistant Examiner* — Cassandra L Decker
(74) *Attorney, Agent, or Firm* — Harrity & Harrity LLP/Qualcomm Incorporated

(57) ABSTRACT

Various aspects of the present disclosure generally relate to wireless communication and radar detection. In some aspects, a radar device may perform, at an initial listen before talk (LBT) frame boundary associated with an initial LBT frame of a plurality of LBT frames, an initial LBT procedure, wherein the initial LBT frame has a frame length that is larger than a propagation delay associated with a maximum detectable range associated with the radar device; and transmit a radar signal based at least in part on a successful result of the initial LBT procedure or an additional LBT procedure. Numerous other aspects are provided.

30 Claims, 7 Drawing Sheets

(56) References Cited

U.S. PATENT DOCUMENTS

| | | | |
|---|---|---|---|
| 2018/0288802 A1* | 10/2018 | Xu | H04W 72/23 |
| 2019/0391247 A1 | 12/2019 | Gulati et al. | |
| 2021/0003662 A1* | 1/2021 | Aydogdu | G01S 13/343 |
| 2021/0041530 A1* | 2/2021 | Jeong | G01S 13/325 |
| 2021/0156982 A1* | 5/2021 | Stettiner | G01S 13/931 |
| 2022/0075021 A1* | 3/2022 | Åström | H04M 1/74 |
| 2022/0116162 A1* | 4/2022 | Song | G01S 7/0232 |
| 2023/0014866 A1* | 1/2023 | Song | G01S 7/0232 |

OTHER PUBLICATIONS

International Search Report and Written Opinion-PCT/US2021/070886-ISA/EPO-Nov. 4, 2021.

* cited by examiner

FRAME BASED LISTEN BEFORE TALK FOR RADAR

CROSS-REFERENCE TO RELATED APPLICATION

This Patent Application claims priority to U.S. Provisional Patent Application No. 62/705,792, filed on Jul. 15, 2020, entitled "FRAME BASED LISTEN BEFORE TALK FOR RADAR," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for frame based listen before talk for radar.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LIE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a radar device includes: performing, at an initial listen before talk (LBT) frame boundary associated with an initial LBT frame of a plurality of LBT frames, an initial LBT procedure, wherein the initial LBT frame has a frame length that is larger than a propagation delay associated with a maximum detectable range associated with the radar device; and transmitting a radar signal based at least in part on a successful result of the initial LBT procedure or an additional LBT procedure.

In some aspects, a radar device for wireless communication includes: a memory; and one or more processors coupled to the memory, the one or more processors configured to: perform, at an initial LBT frame boundary associated with an initial LBT frame of a plurality of LBT frames, an initial LBT procedure, wherein the initial LBT frame has a frame length that is larger than a propagation delay associated with a maximum detectable range associated with the radar device; and transmit a radar signal based at least in part on a successful result of the initial LBT procedure or an additional LBT procedure.

In some aspects, a non-transitory computer-readable medium storing a set of instructions for wireless communication includes: one or more instructions that, when executed by one or more processors of a radar device, cause the radar device to: perform, at an initial LBT frame boundary associated with an initial LBT frame of a plurality of LBT frames, an initial LBT procedure, wherein the initial LBT frame has a frame length that is larger than a propagation delay associated with a maximum detectable range associated with the radar device; and transmit a radar signal based at least in part on a successful result of the initial LBT procedure or an additional LBT procedure.

In some aspects, an apparatus for wireless communication includes: means for performing, at an initial LBT frame boundary associated with an initial LBT frame of a plurality of LBT frames, an initial LBT procedure, wherein the initial LBT frame has a frame length that is larger than a propagation delay associated with a maximum detectable range associated with the apparatus; and means for transmitting a radar signal based at least in part on a successful result of the initial LBT procedure or an additional LBT procedure.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
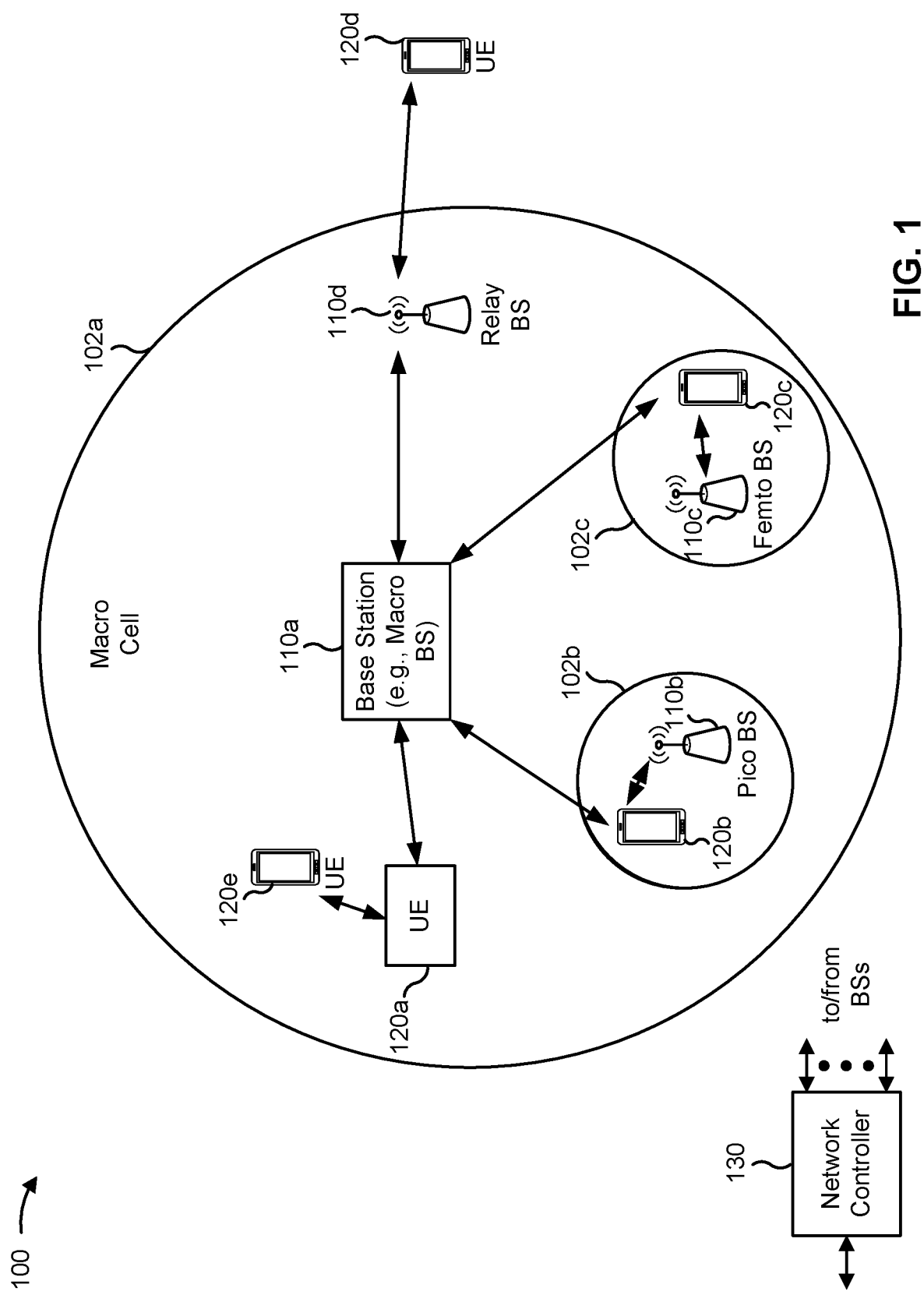
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LIE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. ABS for a pico cell may be referred to as a pico BS. ABS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
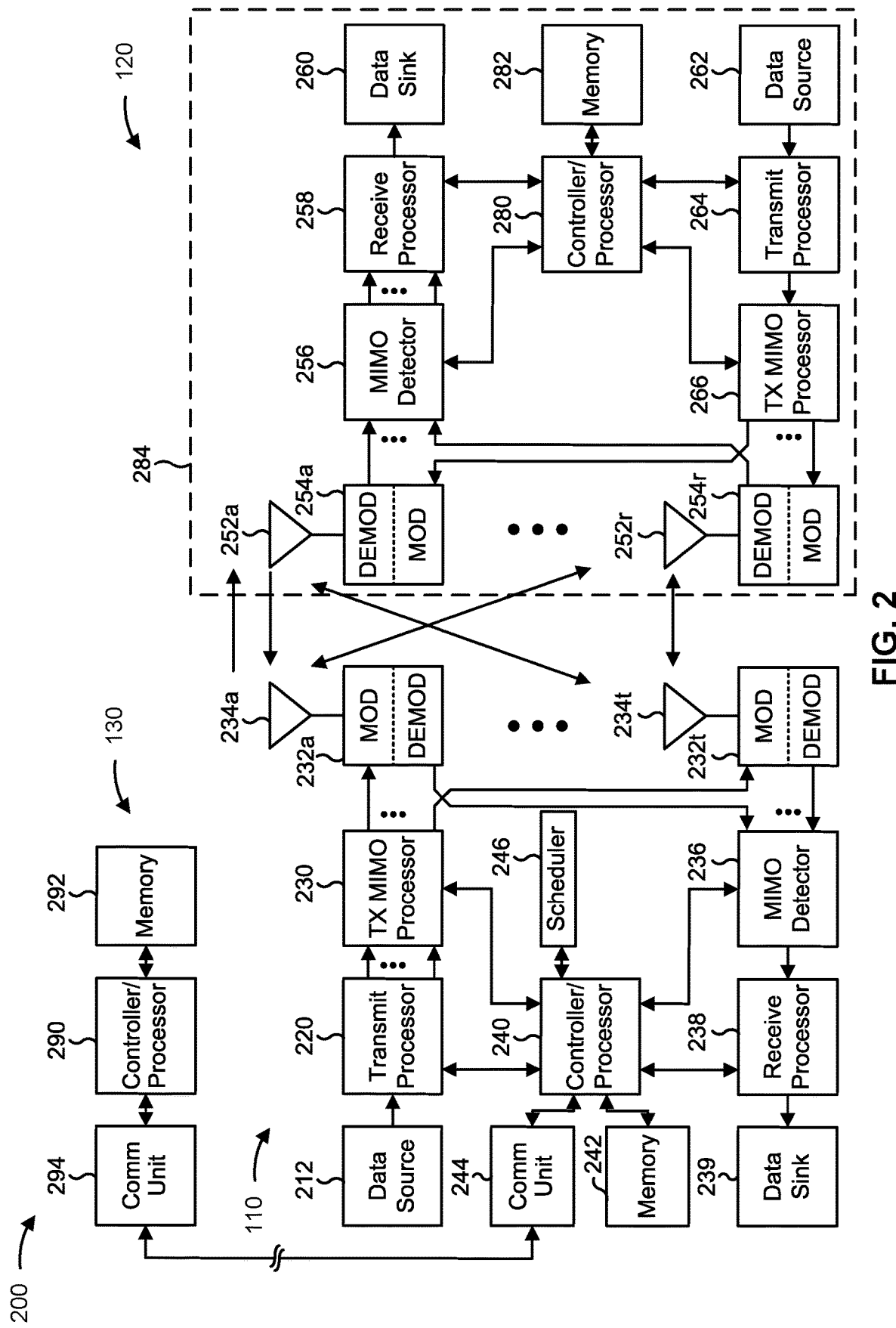
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 5-6).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 5-6).

Controller/processor 240 of base station 110, controller/processor 280 of UE 120, and/or any other component(s) of FIG. 2 may perform one or more techniques associated with frame based listen before talk (LBT) for radar, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, and/or other processes as described herein. In some aspects, executing instructions may include running the instructions, converting the instructions, compiling the instructions, and/or interpreting the instructions, among other examples.

In some aspects, a radar device (which may be, include, or be included in a base station 110, a UE 120, and/or the like) may include means for performing, at an initial LBT frame boundary associated with an initial LBT frame of a plurality of LBT frames, an initial LBT procedure, wherein the initial LBT frame has a frame length that is larger than a propagation delay associated with a maximum detectable range associated with the radar device, means for transmitting a radar signal based at least in part on a successful result of the initial LBT procedure or an additional LBT procedure, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
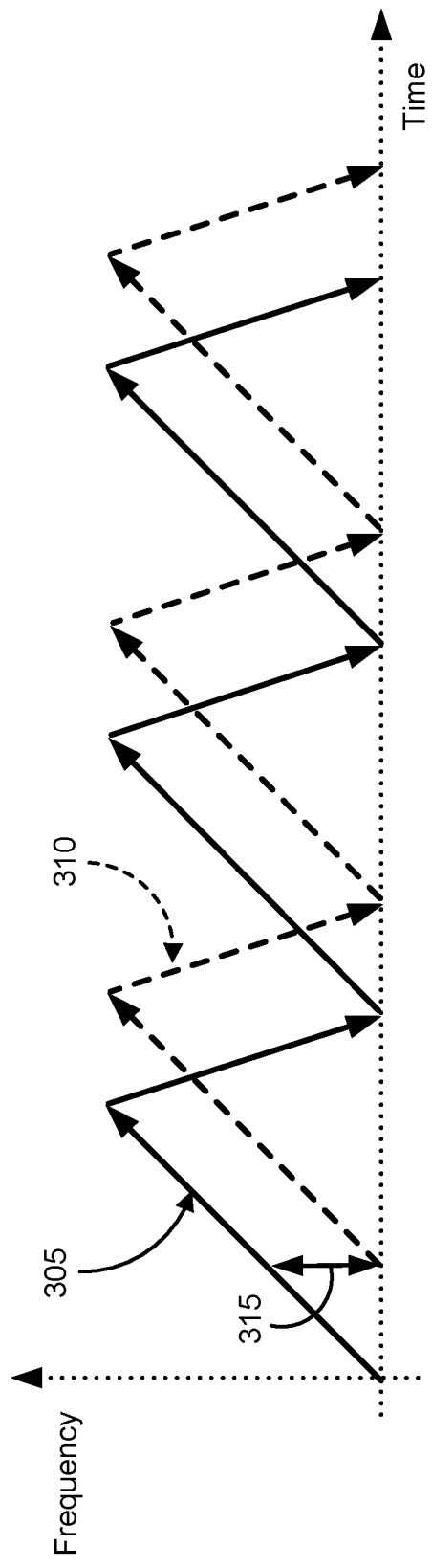
FIGS. 3 and 4 are diagrams conceptually illustrating examples associated with frequency modulated continuous wave radar detection, in accordance with the present disclosure.

FIG. 3 is a diagram conceptually illustrating an example 300 associated with frequency modulated continuous wave (FMCW) radar detection, in accordance with the present disclosure. Example 300 illustrates repetitions of an FMCW chirp 305 (as shown by the solid arrows above the "time" axis) in terms of frequency over time and of a received signal 310 (as shown by the dashed arrows above the "time" axis).

In some aspects, for example, a single instance of the FMCW chirp 305 may be represented by a pair of arrows—a rising arrow representing an increase from a first frequency value to a second frequency value, and an immediately subsequent falling arrow, indicating a decrease from the second frequency value to the first frequency value. Similarly, a single instance of the received signal 310 may be represented by a pair of arrows—a rising arrow representing an increase from a first frequency value to a second frequency value and an immediately subsequent falling arrow, indicating a decrease from the second frequency value to the first frequency value.

In some aspects, the FMCW chirp 305 may be generated using a waveform component (e.g., the waveform component 710 shown in FIG. 7 and discussed below in connection therewith, and/or the like) and transmitted using a transmission component (e.g., the transmission component 704 shown in FIG. 7 and discussed below in connection therewith, and/or the like). In some aspects, the received signal 310 may be received by a reception component (e.g., the reception component 702 shown in FIG. 7 and discussed below in connection therewith, and/or the like). In some aspects, the received signal 310 may be used to detect a target.

FMCW radar uses a linear frequency modulated signal to obtain range. The received signal is mixed with the transmitted signal to obtain the beat frequency 315 between the two. The beat frequency may be a difference between an instantaneous frequency of the FMCW chirp 305 and a corresponding instantaneous frequency of the received signal 310. The beat frequency may be a function of the round-trip time to the reflecting target, and therefore can be mapped directly to its range. Beamforming associated with multiple receiver channels may be used to determine direction of arrival (DoA) of a received signal, which may correlate to a target's azimuthal location. Multiple radar signal chirps may be transmitted in a train of equally spaced pulses in time Radial motion occurring between pulses within a range of resolution cell induces a shift over the pulses, which may be used to compute the Doppler radial velocity in that cell. Received radar data may be expressed as a three-dimensional (3D) tensor, with the first two dimensions (range and DoA) making up polar space, and the third dimension (Doppler radial velocity) containing velocity information.

As indicated above, FIG. 3 is provided merely as one or more examples. Other examples may differ from what is described with regard to FIG. 3.

Figure 4:
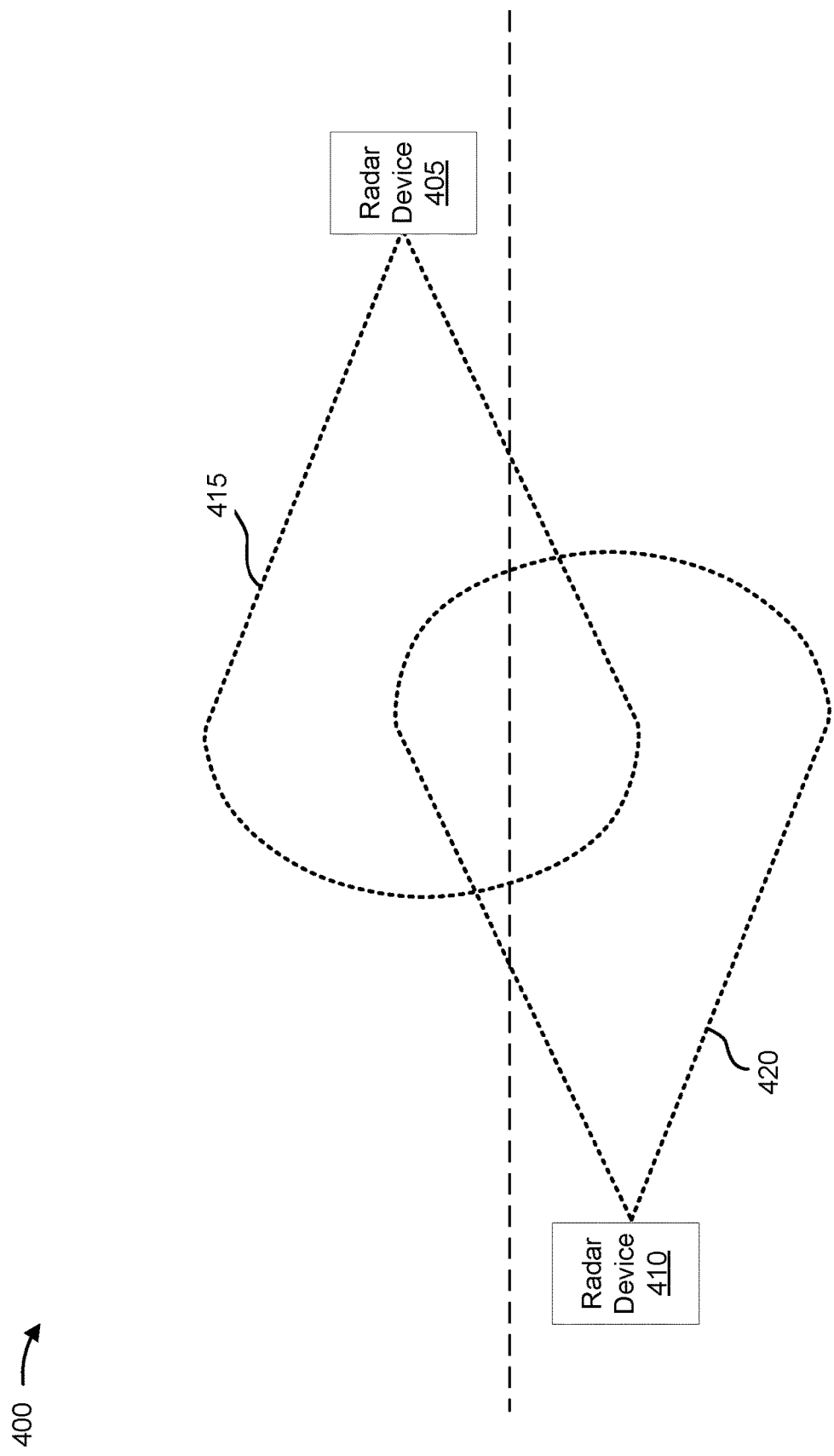

FIG. 4 illustrates an example associated with FMCW radar detection, in accordance with the present disclosure. As shown, a radar device 405 and a radar device 410 may transmit signals 415 and 420, respectively.

The radar device 405 and/or the radar device 410 may be, be similar to, include, or be included in a base station (such as the base station 110 shown in, and described in connection with, FIGS. 1 and/or 2), a UE (such as the UE 120 shown in, and described in connection with, FIGS. 1 and/or 2), and/or the like. In some aspects, the radar devices 405 and/or 410 (and/or UEs associated therewith) may be implemented in one or more vehicles. The one or more vehicles may include any vehicle that includes a radar device as described herein. For example, a vehicle may be a consumer vehicle, an industrial vehicle, a commercial vehicle, and/or the like. A vehicle may be capable of traveling and/or providing transportation via public roadways, may be capable of use in operations associated with a worksite (e.g., a construction site), and/or the like. A vehicle may be controlled autonomously and/or semi-autonomously. Additionally, or alternatively, a vehicle may be controlled by an operator.

In some cases, the radar device 405 may transmit the signal 415 in a full duplex mode (e.g., data or radar signals may be transmitted and received simultaneously at the radar device 405 or the radar device 410). As an illustrative example, the signals 415 and 420 may be examples of FMCW radar signals. In many instances, particularly when other nearby FMCW radar devices are being used, distinguishing between interference and real targets may be difficult. In some cases, this difficulty is due to the fact that a beat frequency, calculated based at least in part on a difference between instantaneous frequencies of the transmitted FMCW signal and a received interference signal, may be indistinguishable from a beat frequency associated with a reflective target. This may be particularly true where the interference signal is a transmitted FMCW chirp from another, nearby, radar device. For instance, the radar device 405 may be moving towards the radar device 410. The radar device 410 may be transmitting the signal 420 (e.g., a FMCW radar signal) at a same time or on same resources that the 405 is transmitting the signal 415. As a result, a radar device may trigger unnecessary actions based on false detection of a target, fail to trigger actions that should be triggered in the presence of a target based on a failure to detect a target due to the presence of interference, transmit additional radar chirps in an attempt to distinguish a target, thereby increasing processing and communication resource consumption, and/or the like.

Some implementations utilize an LBT procedure to determine whether radio frequency resources are occupied or unoccupied, which may enable the wireless device to avoid interference (e.g., the radar device may refrain from transmitting or proceed to transmit a radar signal based on a result of the one or more LBT procedures indicating whether a set of resources are clear for transmission). In such LBT procedures, the radar device may perform such LBT operations based on a generated waveform for a signal (e.g., a radar signal), which may result in more accurate interference measurements for signaling over a set of resources. For example, the radar device may identify a set of transmission parameters (e.g., transmission parameters for a chirp of an FMCW radar signal) and generate a waveform for a signal in accordance with the parameters. The radar device may mix the generated waveform with a received signal (e.g., a received energy or detected signal from performing channel sensing over a set of resources) to determine whether a transmission of the signal with the generated waveform would cause or be subject to interference with another signal from another radar device.

In some examples, the LBT procedure may be successful (e.g., an interference measurement may satisfy a threshold) and the radar device may transmit the signal using the set of transmission parameters. In some other examples, the LBT procedure may fail. In some examples, the radar device may perform another LBT procedure with a different set of transmission parameters. Additionally or alternatively, the radar device may select a set of transmission parameters that results in the least interference for transmission (e.g., in the event of LBT failure when a plurality of sets of transmission parameters fail to satisfy a threshold). However, transmitting an FMCW with different transmission parameters may still result in transmission at the same time as interfering transmissions. Moreover, simply repeating the LBT procedure upon an LBT failure may result in performing an unnecessary number of LBT procedures, which may lead to increased processing and communication resource consumption, and/or the like.

According to various techniques and apparatuses described herein, a radar device may perform a frame based LBT procedure, in which the timing of repetitions of an LBT procedure is based on time frames that are configured according to a synchronized clock. In this way, a radar device may repeat LBT procedures according to a schedule that facilitates moving beat frequencies associated with interference out of band so that the interference can be filtered out. As a result, aspects of the frame based LBT procedure described herein may facilitate strategic timing of LBT procedures so as to reduce the number of LBT procedures performed while preserving the benefits of performing LBT procedures. In this way, aspects may facilitate reducing the processing resources and power consumption used in determining occupation of radio resources to facilitate effective FMCW radar detection, and/or the like.

As indicated above, FIG. 4 is provided as an example. Other examples may differ from what is described with regard to FIG. 4.

Figure 5:
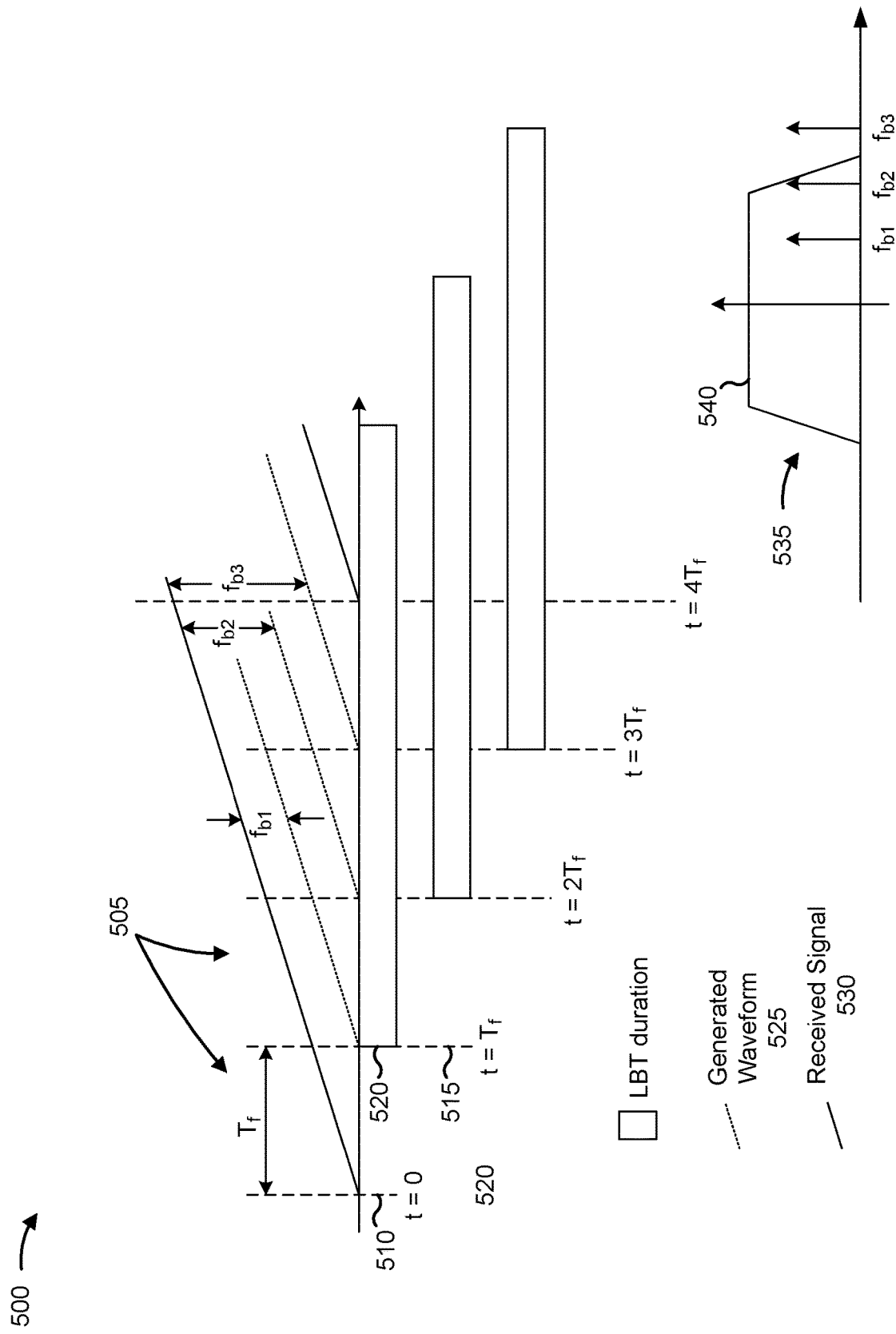
FIG. 5 illustrates an example of frame based listen before talk (LBT) for radar, in accordance with the present disclosure.

FIG. 5 illustrates an example 500 of frame based LBT for radar devices, in accordance with the present disclosure. Aspects of the LBT techniques described in connection with FIG. 5 may be performed by a radar device such as, for example, the radar device 405 shown in FIG. 4, the radar device 410 shown in FIG. 4, and/or the like.

In some aspects of the techniques described herein, the radar device and other radar devices associated with a network may include a common notion of time. For example, radar devices that wirelessly communicate with a wireless network may include a synchronized clock and may be configured to synchronize the clock based at least in part on a geo-positioning system, a sidelink communication link, and/or the like. In some aspects, for example, one or more radar devices may synchronize clocks with one another via a sidelink communication link. In some aspects, a global time may be maintained by a geo-positioning system server or other entity and a radar device may synchronize the synchronized clock based at least in part on communications with the geo-positioning system server or other entity.

As shown by reference number 505, aspects of the frame based LBT procedure described herein may be based at least in part on a plurality of LBT frames. Each LBT frame 505 may be defined by a pair of adjacent frame boundaries 510, 515 and may include a frame length, $T_f$, between the frame boundaries 510 and 515. In some aspects, the LBT frames 505 may be equally spaced—each of the plurality of LBT frames may have an equal frame length, $T_f$. In this way, a first radar device within a specified distance of a second radar device (e.g., within a maximum detectable range associated with one or more of the radar devices, and/or the like) may, based on the synchronized clock, determine that a particular LBT frame boundary 510 or 515 occurs at the same time instance at which the second radar device determines the LBT frame boundary 510 or 515 to occur. For example, LBT frame boundaries may be defined to occur at $t=0, T_f, 2T_f, 3T_f, \ldots$, with reference to some established $t=0$.

In some aspects, LBT frames may be defined such that a chirp length, $T_c$, of a radar chirp (e.g., an FMCW chirp) may be an integer multiple of the frame length. For example, in some aspects, the chirp length $T_c=mT_f$, where m an integer. In some aspects, a radar frame may begin at an LBT frame boundary 510, 515. A radar frame is a time frame in which a train of radar chirps is transmitted (or is configured to be transmitted). In this way, a first chirp of a train of chirps may begin at an LBT frame boundary 510, 515. In some aspects, the frame length, $T_f$, may be larger than a propagation delay associated with a maximum detectable range associated with the radar device. In some aspects, the propagation delay associated with the maximum detectable range may be less than the chirp length, $T_c$.

As shown by reference number 520, the radar device may perform an initial LBT procedure at an initial LBT frame boundary 515, $t=T_f$. The initial LBT procedure may be performed during an initial LBT period that begins at the initial LBT frame boundary, 515. The initial LBT period has an LBT duration, $T_{LBT}$, that is greater than a chirp length, $T_c$. Additional LBT procedures may be performed during additional LBT periods that begin at subsequent LBT frame boundaries. In this way, when an LBT procedure is configured to be performed, the LBT procedure is performed during a period, $[nT_f, nT_f+T_{LBT}]$, where n is an integer value. In some aspects, the LBT duration, $T_{LBT}$, may have a length equal to the length of a radar frame (e.g., an FMCW frame).

In some aspects, an LBT procedure (e.g., the initial LBT procedure, an additional LBT procedure, and/or the like) may be performed based at least in part on a set of transmission parameters for a radar signal that the radar device intends to transmit. In some aspects, the transmission parameters may be an example of chirp parameters for a cycle of an FMCW radar signal. In some aspects, the transmission parameters may include a carrier frequency, a bandwidth sweep range (e.g., the waveform may be transmitted across a 1 GHz range, a 1.5 GHz range, and/or the like), a sweeping time (e.g., the radar device may complete a bandwidth sweep of the waveform in 2 microseconds, 6 microseconds, 12 microseconds, and/or the like), a direction of a sweep (e.g., a chirp of the waveform may be directed from a 77 degree angle from the radar device to a 78 degree angle from the radar device, or from the 78 degree angle to the 77 degree angle, although any parameter indicating a direction of the sweep may be used), and/or the like. The radar device may utilize the set of transmission parameters to determine (e.g., generate) a waveform for the signal (e.g., the signal 415 shown in FIG. 4). For example, the radar device may generate an analog transmit waveform but may refrain from transmitting a signal for a time period (e.g., zero power may be implemented with the transmit waveform until completion of an LBT period).

The radar device may perform the LBT procedure using the generated waveform 525. For example, the radar device may perform channel sensing on a set of resources (e.g., resources that the radar device intends to utilize to transmit the generated waveform), in order to determine if the resources are occupied by another signal (e.g., the signal 420 transmitted by the radar device 410 shown in FIG. 4). The radar device may adjust a received signal 530 (e.g., a received signal from a channel sensing procedure) based on the generated waveform 525. Adjusting the received signal 530 may include mixing the generated waveform 525 with a received energy associated with the received signal 530.

In some aspects, adjusting the received signal 530 may include processing an output (e.g., a mixer output) of the mixture of the waveform 525 and the received signal 530. Such processing may include filtering and performing a spectral analysis. The spectral analysis may include performing a fast-Fourier transform (FFT) of the output, which may yield a measurement (e.g., a value such as a peak of a spectrum of the mixture of the waveform 525 and the received signal 530). In some aspects, performing the spectral analysis may be used to determine a beat frequency corresponding to the LBT procedure. The beat frequency may be associated with the generated waveform 525 and the received signal 530.

In some aspects, as shown by reference number 535, different beat frequencies (associated with different LBT procedures) may be represented as corresponding spikes on a range spectrum. In some aspects, the beat frequencies corresponding to certain LBT procedures (e.g., the beat frequency, $f_{b3}$, corresponding to a third LBT procedure performed at $t=3T_f$) becomes out of band and is, therefore, filtered out based at least in part on a filter 540. In some aspects, filtered out beat frequencies may not be detected by the radar device, in which case the radar device may determine a successful result of an LBT procedure (e.g., determine that a channel is clear) based at least in part on determining that no beat frequencies are detected in association with the LBT procedure.

The radar device may transmit a radar chirp corresponding to the parameters associated with the generated waveform 525 based at least in part on determining a successful result. In some aspects, the radar chirp may be transmitted following the LBT period corresponding to the successful LBT procedure. In some aspects, the radar device may determine a successful result by detecting a plurality of beat frequencies corresponding to the plurality of LBT frames and determining a successful LBT frame of the plurality of LBT frames. In some aspects, an amount of interference energy detected in association with the successful LBT frame may be less than an amount of interference energy detected in association with at least one other LBT frame of the plurality of LBT frames. The radar device may transmit the radar signal at an LBT frame boundary of the successful LBT frame.

In some aspects, an amount of interference energy detected in association with the successful LBT frame may be less than a threshold. In some aspects, the radar device may compare a spectral measurement to a threshold. For example, the radar device may compare a threshold value to a peak value of a spectrum obtained from processing the mixer output of the generated waveform 525 and the received signal 530 on the set of resources. The radar device may determine whether the threshold is satisfied based on the comparison. For example, the radar device may determine that the LBT procedure was successful (e.g., a result of the comparison of the LBT procedure indicates that transmitting the signal with the generated waveform 525 in accordance with the set of transmit parameters would result in a relatively low amount of interference with the signal 530).

The radar device may determine an unsuccessful result of the LBT procedure based at least in part on detecting a beat frequency. In some aspects, the radar device may schedule an additional LBT procedure to occur at an additional LBT frame boundary associated with an additional LBT frame that occurs after the LBT frame and LBT period corresponding to the unsuccessful result. In some aspects, the chirp length, $T_c$, may not be an integer multiple of $T_f$, in which case the radar device may perform additional LBT procedures (e.g., an LBT procedure for every LBT frame boundary within a corresponding radar frame) to detect a clean channel.

As indicated above, FIG. 5 is provided as an example. Other examples may differ from what is described with regard to FIG. 5.

Figure 6:
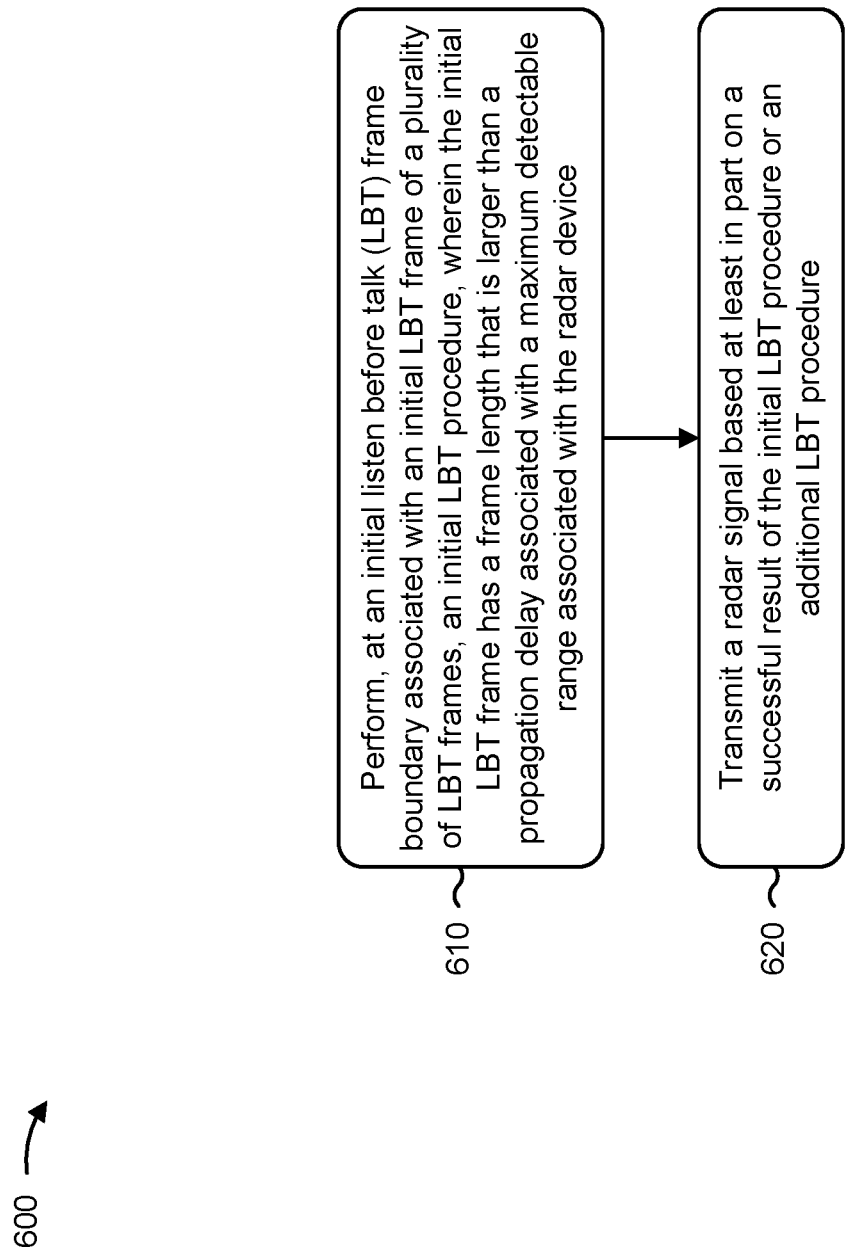
FIG. 6 is a diagram illustrating an example process associated with LBT for radar, in accordance with the present disclosure.

FIG. 6 is a diagram illustrating an example process 600 performed, for example, by a radar device, in accordance with the present disclosure. Example process 600 is an example where the radar device (e.g., the radar device 405 described in connection with FIG. 4, the radar device 410 described in connection with FIG. 4, the radar device described in connection with FIG. 5, and/or the like) performs operations associated with frame based LBT for radar.

As shown in FIG. 6, in some aspects, process 600 may include performing, at an initial LBT frame boundary associated with an initial LBT frame of a plurality of LBT frames, an initial LBT procedure, wherein the initial LBT frame has a frame length that is larger than a propagation delay associated with a maximum detectable range associated with the radar device (block 610). For example, the radar device (e.g., using transmit processor 220, transmit processor 264, receive processor 238, receive processor 258, controller/processor 240, controller/processor 280, memory 242, memory 282, and/or the like) may perform, at an initial LBT frame boundary associated with an initial LBT frame of a plurality of LBT frames, an initial LBT procedure, as described above. In some aspects, the initial LBT frame has a frame length that is larger than a propagation delay associated with a maximum detectable range associated with the radar device.

As further shown in FIG. 6, in some aspects, process 600 may include transmitting a radar signal based at least in part on a successful result of the initial LBT procedure or an additional LBT procedure (block 620). For example, the radar device (e.g., using transmit processor 220, transmit processor 264, controller/processor 240, controller/processor 280, memory 242, memory 282, and/or the like) may transmit a radar signal based at least in part on a successful result of the initial LBT procedure or an additional LBT procedure, as described above.

Process 600 may include additional aspects, such as any single aspect or any combination of aspects described below and/or in connection with one or more other processes described elsewhere herein.

In a first aspect, performing the initial LBT procedure comprises performing the initial LBT procedure during an initial LBT period that begins at the initial LBT frame boundary.

In a second aspect, alone or in combination with the first aspect, the initial LBT period has an LBT duration, where the LBT duration is greater than a chirp length.

In a third aspect, alone or in combination with one or more of the first and second aspects, the chirp length is an integer multiple of the frame length.

In a fourth aspect, alone or in combination with one or more of the first through third aspects, the LBT duration is equal to a radar frame length associated with a radar frame, where the radar frame corresponds to a plurality of radar chirps.

In a fifth aspect, alone or in combination with one or more of the first through fourth aspects, the radar frame comprises an FMCW frame.

In a sixth aspect, alone or in combination with one or more of the first through fifth aspects, an additional LBT frame of the plurality of LBT frames has a length equal to the frame length.

In a seventh aspect, alone or in combination with one or more of the first through sixth aspects, process 600 includes determining the plurality of LBT frames based at least in part on a synchronized clock associated with a network.

In an eighth aspect, alone or in combination with one or more of the first through seventh aspects, process 600 includes synchronizing the synchronized clock based at least in part on at least one of a geo-positioning system or a sidelink communication link.

In a ninth aspect, alone or in combination with one or more of the first through eighth aspects, performing the initial LBT procedure comprises performing the initial LBT procedure based at least in part on a set of transmission parameters for the radar signal.

In a tenth aspect, alone or in combination with one or more of the first through ninth aspects, transmitting the radar signal comprises transmitting the radar signal at a transmission time following completion of the initial LBT procedure or the additional LBT procedure.

In an eleventh aspect, alone or in combination with one or more of the first through tenth aspects, process 600 includes determining an unsuccessful result of the initial LBT procedure and scheduling the additional LBT procedure to occur at an additional LBT frame boundary associated with an additional LBT frame that occurs after the initial LBT frame and an initial LBT period.

In a twelfth aspect, alone or in combination with one or more of the first through eleventh aspects, the propagation delay is less than a chirp length.

In a thirteenth aspect, alone or in combination with one or more of the first through twelfth aspects, the initial LBT procedure is based at least in part on a beat frequency band that corresponds to the maximum detectable range.

In a fourteenth aspect, alone or in combination with one or more of the first through tenth aspects, process 600 includes determining the successful result of the initial LBT procedure or the additional LBT procedure, where determining the successful result comprises determining that a beat frequency has not been detected in association with the initial LBT procedure or the additional LBT procedure.

In a fifteenth aspect, alone or in combination with one or more of the first through tenth aspects, process 600 includes determining the successful result of the initial LBT procedure or the additional LBT procedure, where determining the successful result comprises detecting a plurality of beat frequencies corresponding to the plurality of LBT frames and determining a successful LBT frame of the plurality of LBT frames, where an amount of interference energy detected in association with the successful LBT frame is less than an amount of interference energy detected in association with at least one other LBT frame of the plurality of LBT frames, and where transmitting the radar signal comprises transmitting the radar signal at an LBT frame boundary of the successful LBT frame.

In a sixteenth aspect, alone or in combination with one or more of the first through fifteenth aspects, the radar device is associated with at least one of a wireless communication device, a user equipment, or a vehicle.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
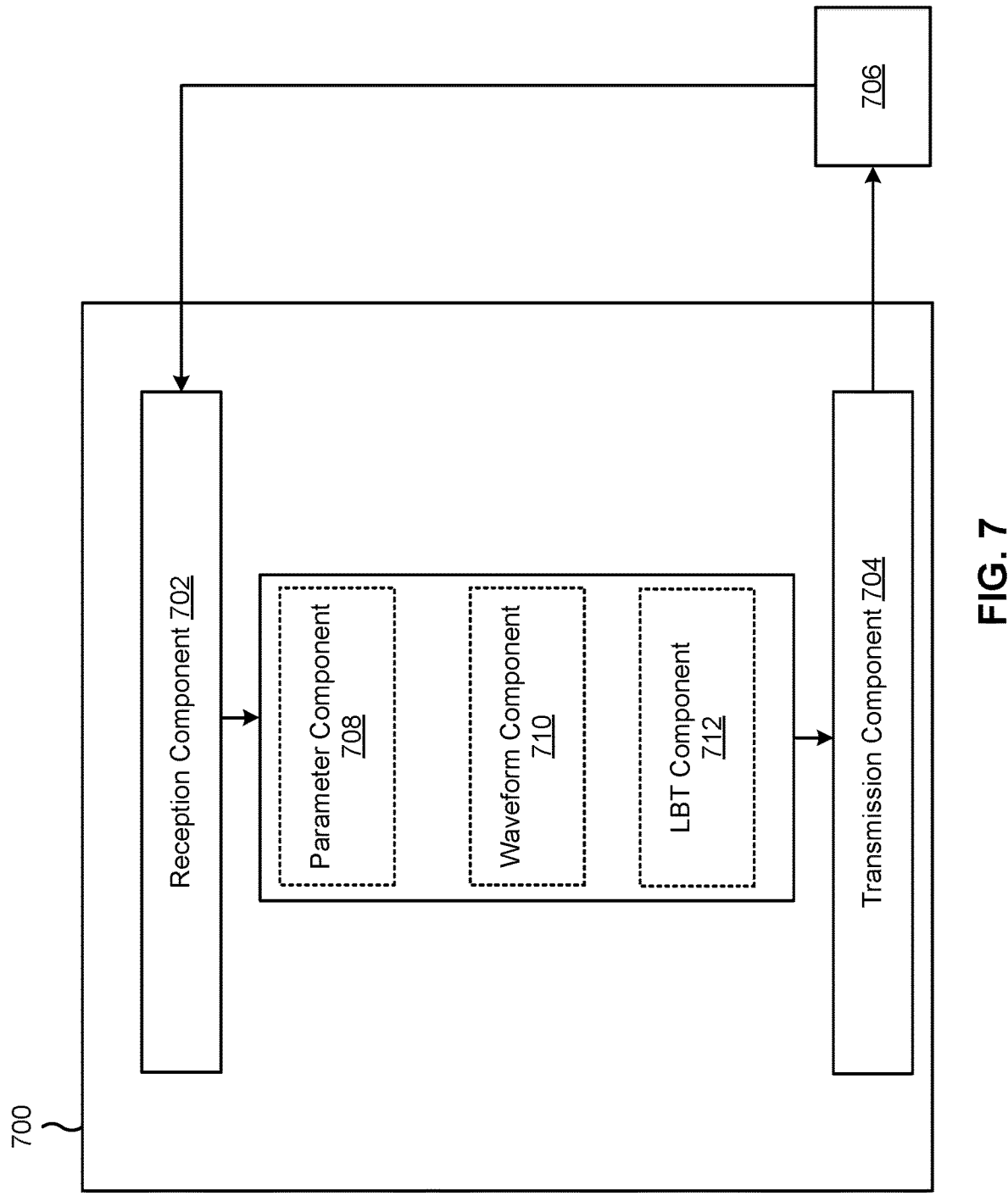
FIG. 7 is a block diagram of an example apparatus for wireless communication and radar detection, in accordance with the present disclosure.

FIG. 7 is a block diagram of an example apparatus 700 for wireless communication and radar detection. The apparatus 700 may be a radar device (e.g., the radar device 405 described in connection with FIG. 4, the radar device 410 described in connection with FIG. 4, the radar device described in connection with FIG. 5, the radar device described in connection with FIG. 6, and/or the like), or a radar device may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include one or more of a parameter component 708, a waveform component 710, and/or an LBT component 712, among other examples.

In some aspects, the apparatus 700 may be configured to perform one or more operations described herein in connection with FIG. 5. Additionally or alternatively, the apparatus 700 may be configured to perform one or more processes described herein, such as process 600 of FIG. 6. In some aspects, the apparatus 700 and/or one or more components shown in FIG. 7 may include one or more components of the UE 120 described above in connection with FIG. 2. Additionally, or alternatively, one or more components shown in FIG. 7 may be implemented within one or more components described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive signals, such as reference signals, control information, data communications, received signals (e.g., received signals) or a combination thereof. In some aspects, the reception component 702 may receive communications from the apparatus 706. The reception component 702 may provide received signals to one or more other components of the apparatus 700. In some aspects, the reception component 702 may perform signal processing on the received signals (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE 120 described above in connection with FIG. 2.

The transmission component 704 may transmit signals, such as reference signals, control information, data communications, radar signals (e.g., FMCW chirps, and/or the like), or a combination thereof. In some aspects, the transmission component 704 may transmit communications to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated signals (such as filtering, amplification, modulation, digital-to-analog conversion, multiplexing, interleaving, mapping, or encoding, among other examples), and may transmit the processed signals. In some aspects, the transmission component 704 may include one or more antennas, a modulator, a transmit MIMO processor, a transmit processor, a controller/processor, a memory, or a combination thereof, of the UE 120 described above in connection with FIG. 2. In some aspects, the transmission component 704 may be co-located with the reception component 702 in a transceiver.

The parameter component 708 may identify a set of transmission parameters of a signal for transmission from the radar device. The parameter component 708 may include a memory. The parameter component 708 may include one or more processors operatively coupled to the memory. In some aspects, the one or more processors may be configured to identify the set of transmission parameters. The parameter component 708 may include one or more instructions that, when executed by one or more processors of a radar device, cause the radar device to identify a set of transmission parameters of a signal for transmission from the radar device. The parameter component 708 may include means for identifying a set of transmission parameters of a signal for transmission from the radar device.

The waveform component 710 may generate a transmission waveform of the signal on a set of radio resources based on the set of transmission parameters. The waveform component 710 may include a memory. The waveform component 710 may include one or more processors operatively coupled to the memory. In some aspects, the one or more processors may be configured to generate the waveform. The waveform component 710 may include one or more instructions that, when executed by one or more processors of a radar device, cause the radar device to generate a transmission waveform of the signal on a set of radio resources based on the set of transmission parameters. The waveform component 710 may include means for generating a transmission waveform of the signal on a set of radio resources based on the set of transmission parameters.

The LBT component 712 may perform, at an initial LBT frame boundary associated with an initial LBT frame of a plurality of LBT frames, an initial LBT procedure, wherein the initial LBT frame has a frame length that is larger than a propagation delay associated with a maximum detectable range associated with the radar device. The transmission component 704 may transmit a radar signal based at least in part on a successful result of the initial LBT procedure or an additional LBT procedure.

The LBT component 712 may include a memory. The LBT component 712 may include one or more processors operatively coupled to the memory. The one or more processors may be configured to perform an LBT procedure. The LBT component 712 may include one or more instructions that, when executed by one or more processors of a radar device, cause the radar device to perform one or more LBT procedures.

The LBT component 712 may include means for performing, at an initial LBT frame boundary associated with an initial LBT frame of a plurality of LBT frames, an initial LBT procedure, wherein the initial LBT frame has a frame length that is larger than a propagation delay associated with a maximum detectable range associated with the apparatus. The transmission component 704 may include means for transmitting a radar signal based at least in part on a successful result of the initial LBT procedure or an additional LBT procedure.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally or alternatively, a set of (one or more) components shown in FIG. 7 may perform one or more functions described as being performed by another set of components shown in FIG. 7.

The following provides an overview of some Aspects of the present disclosure:

Aspect 1: A method of wireless communication performed by a radar device, comprising: performing, at an initial listen before talk (LBT) frame boundary associated with an initial LBT frame of a plurality of LBT frames, an initial LBT procedure, wherein the initial LBT frame has a frame length that is larger than a propagation delay associated with a maximum detectable range associated with the radar device; and transmitting a radar signal based at least in part on a successful result of the initial LBT procedure or an additional LBT procedure.

Aspect 2: The method of Aspect 1, wherein performing the initial LBT procedure comprises performing the initial LBT procedure during an initial LBT period that begins at the initial LBT frame boundary.

Aspect 3: The method of Aspect 2, wherein the initial LBT period has an LBT duration, wherein the LBT duration is greater than a chirp length.

Aspect 4: The method of Aspect 3, wherein the chirp length is an integer multiple of the frame length.

Aspect 5: The method of either of Aspects 3 or 4, wherein the LBT duration is equal to a radar frame length associated with a radar frame, wherein the radar frame corresponds to a plurality of radar chirps.

Aspect 6: The method of Aspect 5, wherein the radar frame comprises a frequency modulated continuous wave frame.

Aspect 7: The method of any of Aspects 1-6, wherein an additional LBT frame of the plurality of LBT frames has a length equal to the frame length.

Aspect 8: The method of any of Aspects 1-7, further comprising determining the plurality of LBT frames based at least in part on a synchronized clock associated with a network.

Aspect 9: The method of Aspect 8, further comprising synchronizing the synchronized clock based at least in part on at least one of: a geo-positioning system, or a sidelink communication link.

Aspect 10: The method of any of Aspects 1-9, wherein performing the initial LBT procedure comprises performing the initial LBT procedure based at least in part on a set of transmission parameters for the radar signal.

Aspect 11: The method of any of Aspects 1-10, wherein transmitting the radar signal comprises transmitting the radar signal at a transmission time following completion of the initial LBT procedure or the additional LBT procedure.

Aspect 12: The method of any of Aspects 1-11, further comprising: determining an unsuccessful result of the initial LBT procedure; and scheduling the additional LBT procedure to occur at an additional LBT frame boundary associated with an additional LBT frame that occurs after the initial LBT frame and an initial LBT period.

Aspect 13: The method of any of Aspects 1-12, wherein the propagation delay is less than a chirp length.

Aspect 14: The method of any of Aspects 1-13, wherein the initial LBT procedure is based at least in part on a beat frequency band that corresponds to the maximum detectable range.

Aspect 15: The method of any of Aspects 1-11, further comprising determining the successful result of the initial LBT procedure or the additional LBT procedure, wherein determining the successful result comprises determining that a beat frequency has not been detected in association with the initial LBT procedure or the additional LBT procedure.

Aspect 16: The method of any of Aspects 1-11, further comprising determining the successful result of the initial LBT procedure or the additional LBT procedure, wherein determining the successful result comprises: detecting a plurality of beat frequencies corresponding to the plurality of LBT frames; and determining a successful LBT frame of the plurality of LBT frames, wherein an amount of interference energy detected in association with the successful LBT frame is less than an amount of interference energy detected in association with at least one other LBT frame of the plurality of LBT frames, wherein transmitting the radar signal comprises transmitting the radar signal at an LBT frame boundary of the successful LBT frame.

Aspect 17: The method of any of Aspects 1-16, wherein the radar device is associated with at least one of: a wireless communication device, a user equipment, or a vehicle.

Aspect 18: An apparatus for wireless communication at a device, comprising a processor; memory coupled with the processor; and instructions stored in the memory and executable by the processor to cause the apparatus to perform the method of one or more of Aspects 1-17.

Aspect 19: A device for wireless communication, comprising a memory and one or more processors coupled to the memory, the one or more processors configured to perform the method of one or more of Aspects 1-17.

Aspect 20: An apparatus for wireless communication, comprising at least one means for performing the method of one or more of Aspects 1-17.

Aspect 21: A non-transitory computer-readable medium storing code for wireless communication, the code comprising instructions executable by a processor to perform the method of one or more of Aspects 1-17.

Aspect 22: A non-transitory computer-readable medium storing a set of instructions for wireless communication, the set of instructions comprising one or more instructions that, when executed by one or more processors of a device, cause the device to perform the method of one or more of Aspects 1-17.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radar device for wireless communication, comprising:
    one or more memories; and
    one or more processors coupled to the one or more memories, the one or more processors configured to:
        perform an initial listen before talk (LBT) procedure that begins at an initial LBT time frame boundary and that is associated with radar signaling,
        wherein the initial LBT time frame boundary is associated with an initial LBT time frame of a plurality of LBT time frames, and
        wherein the plurality of LBT time frames are configured for repetitions of the LBT procedure according to a schedule whereby beat frequencies are filtered from or become out of band; and
        transmit a radar signal based at least in part on a successful result of the initial LBT procedure or an additional LBT procedure.
2. The radar device of claim 1, wherein an LBT duration of the initial LBT procedure is greater than a chirp length.
3. The radar device of claim 1, wherein a chirp length is an integer multiple of a frame length of the initial LBT time frame.
4. The radar device of claim 1, wherein an LBT duration of the initial LBT procedure is equal to a radar frame length associated with a radar frame, wherein the radar frame corresponds to a plurality of radar chirps.
5. The radar device of claim 4, wherein the radar frame comprises a frequency modulated continuous wave frame.
6. The radar device of claim 1, wherein an additional LBT time frame of the plurality of LBT time frames has a length equal to a length of the initial LBT time frame.
7. The radar device of claim 1, wherein the one or more processors are further configured to determine the plurality of LBT time frames based at least in part on a synchronized clock associated with a network.
8. The radar device of claim 7, wherein the one or more processors are further configured to synchronize the synchronized clock based at least in part on at least one of:
    a geo-positioning system, or
    a sidelink communication link.
9. The radar device of claim 1, wherein the one or more processors, when performing the initial LBT procedure, are configured to perform the initial LBT procedure based at least in part on a set of transmission parameters for the radar signal.
10. The radar device of claim 1, wherein the one or more processors, when transmitting the radar signal, are configured to transmit the radar signal at a transmission time following completion of the initial LBT procedure or the additional LBT procedure.
11. The radar device of claim 1, wherein the one or more processors are further configured to:
    determine an unsuccessful result of the initial LBT procedure; and
    schedule the additional LBT procedure to occur at an additional LBT time frame boundary associated with an additional LBT time frame that occurs after the initial LBT time frame.
12. The radar device of claim 1, wherein a propagation delay associated with a maximum detectable range associated with the radar device is less than a chirp length.
13. The radar device of claim 1, wherein the initial LBT procedure is based at least in part on a beat frequency band that corresponds to a maximum detectable range associated with the radar device.
14. The radar device of claim 1, wherein the one or more processors are further configured to determine the successful result of the initial LBT procedure or the additional LBT procedure,
    wherein the one or more processors, when determining the successful result, are configured to determine that a beat frequency has not been detected in association with the initial LBT procedure or the additional LBT procedure.
15. The radar device of claim 1, wherein the one or more processors are further configured to determine the successful result of the initial LBT procedure or the additional LBT procedure,
    wherein the one or more processors, when determining the successful result, are configured to:
        detect a plurality of beat frequencies corresponding to the plurality of LBT time frames; and
        determine a successful LBT time frame of the plurality of LBT time frames, wherein an amount of interference energy detected in association with the successful LBT time frame is less than an amount of interference energy detected in association with at least one other LBT time frame of the plurality of LBT time frames.
16. The radar device of claim 1, wherein the radar device is associated with at least one of:
    a wireless communication device,
    a user equipment, or
    a vehicle.
17. The radar device of claim 1, wherein a length of the initial LBT time frame is larger than a propagation delay associated with a maximum detectable range associated with the radar device.
18. The radar device of claim 1, wherein LBT procedures are performed during LBT periods that begin at LBT time frame boundaries of the plurality of LBT time frames.
19. A method of wireless communication performed by a radar device, comprising:
    performing an initial listen before talk (LBT) procedure that begins at an initial LBT time frame boundary and that is associated with radar signaling,
    wherein the initial LBT time frame boundary is associated with an initial LBT time frame of a plurality of LBT time frames, and wherein the plurality of LBT time frames are configured for repetitions of the LBT procedure according to a schedule whereby beat frequencies are filtered from or become out of band; and transmitting a radar signal based at least in part on a successful result of the initial LBT procedure or an additional LBT procedure.

20. The method of claim 19, wherein an LBT duration of the initial LBT procedure is greater than a chirp length.

21. The method of claim 19, wherein a chirp length is an integer multiple of a frame length of the initial LBT time frame.

22. The method of claim 19, wherein an LBT duration of the initial LBT procedure is equal to a radar frame length associated with a radar frame, wherein the radar frame corresponds to a plurality of radar chirps.

23. The method of claim 19, wherein an additional LBT time frame of the plurality of LBT time frames has a length equal to a length of the initial LBT time frame.

24. The method of claim 19, further comprising:
    determining an unsuccessful result of the initial LBT procedure; and
    scheduling the additional LBT procedure to occur at an additional LBT time frame boundary associated with an additional LBT time frame that occurs after the initial LBT time frame.

25. The method of claim 19, wherein a propagation delay associated with a maximum detectable range associated with the radar device is less than a chirp length.

26. The method of claim 19, wherein the initial LBT procedure is based at least in part on a beat frequency band that corresponds to a maximum detectable range associated with the radar device.

27. The method of claim 19, further comprising determining the successful result of the initial LBT procedure or the additional LBT procedure,
    wherein determining the successful result comprises determining that a beat frequency has not been detected in association with the initial LBT procedure or the additional LBT procedure.

28. The method of claim 19, further comprising determining the successful result of the initial LBT procedure or the additional LBT procedure,
    wherein determining the successful result comprises:
        detecting a plurality of beat frequencies corresponding to the plurality of LBT frames; and
        determining a successful LBT time frame of the plurality of LBT time frames, wherein an amount of interference energy detected in association with the successful LBT time frame is less than an amount of interference energy detected in association with at least one other LBT time frame of the plurality of LBT time frames,
        wherein transmitting the radar signal comprises transmitting the radar signal at an LBT time frame boundary of the successful LBT time frame.

29. A non-transitory computer-readable medium storing a set of instructions for wireless communication, the set of instructions comprising:
    one or more instructions that, when executed by one or more processors of a radar device, cause the radar device to:
    perform an initial listen before talk (LBT) procedure that begins at an initial LBT time frame boundary and that is associated with radar signaling,
        wherein the initial LBT time frame boundary is associated with an initial LBT time frame of a plurality of LBT time frames, and
        wherein the plurality of LBT time frames are configured for repetitions of the LBT procedure according to a schedule whereby beat frequencies are filtered from or become out of band; and
    transmit a radar signal based at least in part on a successful result of the initial LBT procedure or an additional LBT procedure.

30. An apparatus for wireless communication, comprising:
    means for performing an initial listen before talk (LBT) procedure that begins at an initial LBT time frame boundary and that is associated with radar signaling,
        wherein the initial LBT time frame boundary is associated with an initial LBT time frame of a plurality of LBT time frames, and
        wherein the plurality of LBT time frames are configured for repetitions of the LBT procedure according to a schedule whereby beat frequencies are filtered from or become out of band; and
    means for transmitting a radar signal based at least in part on a successful result of the initial LBT procedure or an additional LBT procedure.

* * * * *